United States Patent [19]

Luh

[11] Patent Number: 4,749,244

[45] Date of Patent: Jun. 7, 1988

[54] FREQUENCY INDEPENDENT BEAM WAVEGUIDE

[75] Inventor: Howard H. Luh, Sunnyvale, Calif.

[73] Assignee: Ford Aerospace & Communications Corporation, Detroit, Mich.

[21] Appl. No.: 935,891

[22] Filed: Nov. 28, 1986

[51] Int. Cl.⁴ .................................................. G02B 6/00
[52] U.S. Cl. ............................... 350/96.10; 350/96.28; 350/573
[58] Field of Search ............... 350/96.10, 96.29, 96.28, 350/573, 619; 343/909

[56] References Cited

U.S. PATENT DOCUMENTS

| | | | |
|---|---|---|---|
| 2,994,873 | 8/1961 | Goubau | 343/909 |
| 3,101,472 | 8/1963 | Goubau | 343/909 |
| 3,466,111 | 9/1969 | Ring | 350/573 |
| 3,492,485 | 1/1970 | Marcatili | 350/96.18 |
| 3,521,288 | 7/1970 | Schell | 343/909 |
| 3,574,439 | 4/1971 | Gloge | 350/96.10 X |
| 3,625,585 | 12/1971 | Beiser | 350/573 X |
| 3,733,114 | 5/1973 | Checcacci et al. | 343/911 |
| 3,759,590 | 9/1973 | Arnaud | 350/96.18 |
| 3,781,546 | 12/1973 | Christian et al. | 350/96.18 |

OTHER PUBLICATIONS

Farnell, G. W., "Calculated Intensity and Phase Distribution in the Image Space of a Microwave Lens", *Canadian Journal of Physics*, vol. 35, 1957, pp. 777 et seq.

Chu, T. S., "Geometrical Representation of Gaussian Beam Propagation", *The Bell System Technical Journal*, Feb. 1966, pp. 287 et seq.

*Primary Examiner*—Eugene R. LaRoche
*Assistant Examiner*—Seung Ham
*Attorney, Agent, or Firm*—Edward J. Radlo; Keith L. Zerschling

[57] ABSTRACT

A frequency independent beam waveguide comprises a row of equispaced identical axisymmetric phase setting means (1), which may be lenses or reflectors, or a combination of both, spaced a distance D apart from each other. The focal length of each phase setting means (1) is D/2. A launcher (2) spaced a distance D away from the first phase setting means (1A) in the row emits a beam of electromagnetic energy in the direction of said row. The phase and amplitude distribution in the cross-section (A) of the beam at the mouth of the launcher (2) is duplicated every other phase setting means (1) along the row (at locations B), independent of the frequency of the launched beam. As a result, the beam propagates along the row.

6 Claims, 2 Drawing Sheets

FREQUENCY INDEPENDENT BEAM WAVEGUIDE

DESCRIPTION

1. Technical Field

This invention pertains to the field of causing electromagnetic energy to propagate in a relatively unconfined fashion, i.e., by using lenses or reflectors rather than closed waveguide. The invention finds its greatest applicability at frequencies in excess of 1 GHz, particularly at millimeter wavelengths, where the losses in hollow pipe waveguides can be excessive.

2. Background Art

U.S. Pat. No. 3,101,472 discloses a conventional beam waveguide. At col. 5, lines 30–34, the patent states that in a "simplified case" the phase setting lenses have a focal length of D/2, where D is the distance between lenses. However, the patented device fails to suggest the present invention because: (1) There is no suggestion of frequency independent beam propagation. (2) The patent resets the phases and amplitudes every lens, not every other lens, as evidenced by FIG. 2 and col. 3 line 75 through col. 4 line 1. (3) There is no suggestion as to where the launcher is with respect to the first lens. To be consistent with FIG. 2 of the patent, the launcher, assuming it generates an in-phase wavefront, would have to be D/2 from the first lens, not D as in the present invention; furthermore, this would work for a certain frequency only. (4) Although the patent states that the focal length is D/2 for the "simplified case", in order for the FIG. 2 embodiment to work, the focal length would have to be slightly larger than D/2. Claim 5 more correctly states that the focal length is "approximately" D/2.

Other patents with similar techniques to those of U.S. Pat. No. 3,101,472 are U.S. Pat. Nos. 2,994,873 and 3,521,288.

References giving background information on propagation in conventional beam waveguides are: Farnell, G. W., "Calculated Intensity and Phase Distribution in the Image Space of a Microwave Lens", *Canadian Journal of Physics*, Vol. 35, 1957, pp. 777 et seq.; and Chu, T. S., "Geometrical Representation of Gaussian Beam Propagation", *The Bell System Technical Journal*, February 1966, pp. 287 et seq.

Secondary references are U.S. Pat. Nos. 3,492,485; 3,733,114; 3,759,590; and 3,781,546.

DISCLOSURE OF INVENTION

Several phase setting means (1) are arranged in a row and are spaced a distance D apart from each other. The focal length of each phase setting means (1) is D/2. A launcher (2), which emits a beam of electromagnetic energy, is spaced a distance D away from the first phase setting means (1A) in the row. The wavelength (L) of the electromagnetic beam is very small compared with the diameter of each phase setting means (1). The phase and amplitude distribution of the cross-section (A) of the beam appearing at the mouth of the launcher (2) is duplicated (at locations B) every other phase setting means (1), independent of the frequency of the launched beam. As a result, the beam propagates along the row.

BRIEF DESCRIPTION OF THE DRAWINGS

These and other more detailed and specific objects and features of the present invention are more fully disclosed in the following specification, reference being had to the accompanying drawings, none of which is drawn to scale, in which.

BEST MODE FOR CARRYING OUT THE INVENTION

In the Figures, the wavefront to be duplicated appears at the mouth of launcher 2, lies in a cross-section of the launched beam orthogonal to the page containing the Figures, and is indicated by the letter A. It is this wavefront which must be duplicated at various points along the row of phase setting means 1 in order for the device to act as a beam waveguide.

For purposes of illustration, A is shown as a flat wave, i.e., the radius of curvature of the phasefront is infinite at this point. This implies that the wavefront is in phase, i.e., there is a constant phase distribution throughout the beam cross-section. However, it is not necessary for the field at A to be in-phase. The invention will form the image (both amplitude and phase) of A at each B regardless of the radius of curvature of the phase front at A.

The letter B is used to represent those locations along the propagating beam where the initial wavefront A is duplicated.

The letter C is used to indicate those locations along the propagating beam where the beam is most narrow.

Figure 1:
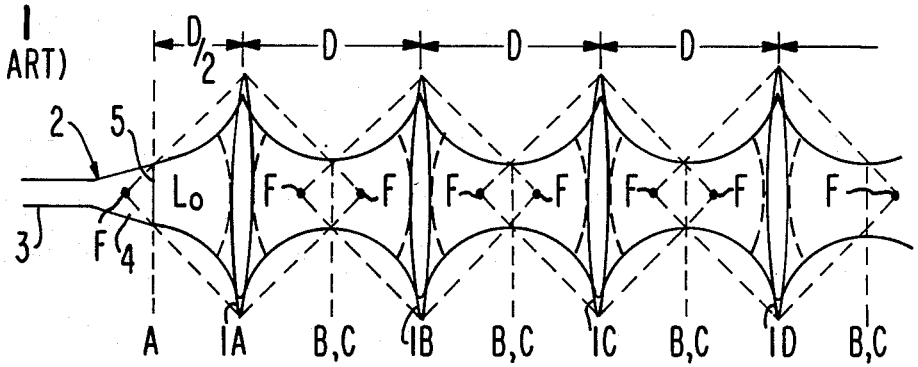
FIG. 1 is a wave diagram illustrating the operation of a conventional beam waveguide of the prior art.
Figure 2:
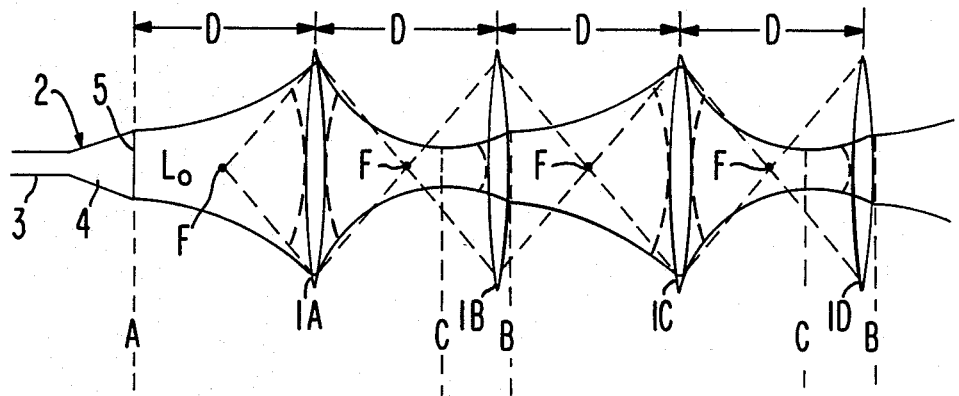
FIG. 2 is a wave diagram illustrating a first embodiment of the present invention in which the phase setting means 1 are lenses and the wavelength of the beam is $L_0$.
Figure 3:
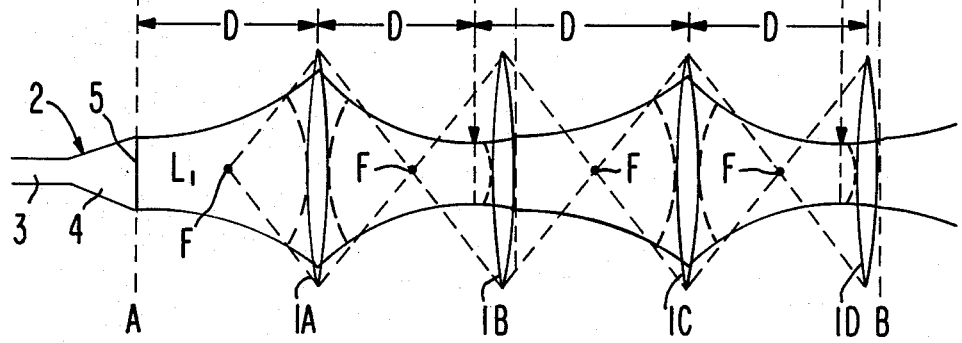
FIG. 3 is an illustration of the FIG. 2 embodiment wherein the wavelength of the beam is $L_1$.

For purposes of consistency, all the launchers 2 are shown as being identical in FIGS. 1–4. Launcher 2 comprises a waveguide 3 terminating in a corrugated horn 4. For such a horn 4, the amplitude distribution in the beam cross-section A is Gaussian. At the open end of the horn 4 is a correcting lens 5 which creates the flat wavefront. In FIGS. 1 and 2, the propagating beam has a wavelength of $L_0$. In FIG. 3, the beam has a wavelength of $L_1$.

Figure 4:
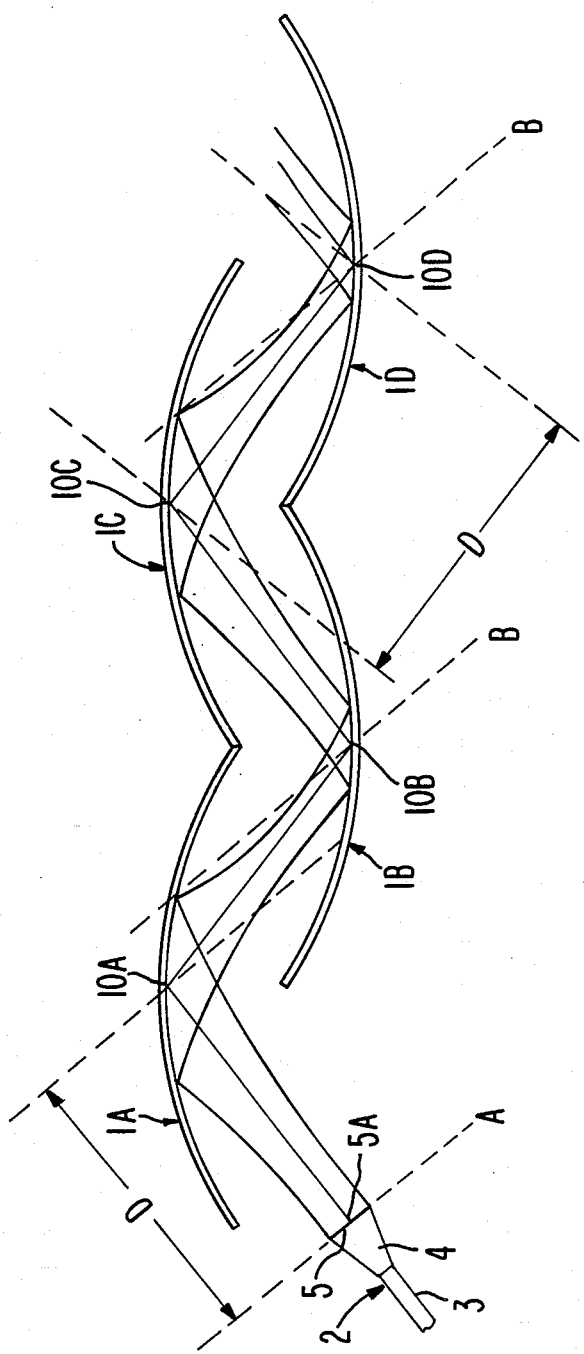
FIG. 4 is a wave diagram illustrating a second embodiment of the present invention in which the phase setting means 1 are reflectors.

In FIGS. 1–3 the phase setting means 1 are lenses, whereas in FIG. 4, the phase setting means 1 are reflectors. In all cases, the phase setting means 1 are spaced a distance D apart from each other in the direction of beam propagation.

The outline of the propagating beam is shown with solid lines; the beam waist (radius) is proportional to the amplitude. The beam propagates from left to right in each Figure. The phase setting means 1 are numbered 1A, 1B, 1C, etc., from left to right. At various points within each beam, the curvature of the wavefront is shown with dashed lines. Dashed lines are also used to connect the focal points F (shown for each lens in FIGS. 1–3) with the outer periphery of the various lenses 1.

In the FIG. 1 conventional beam waveguide of the prior art, as exemplified by the above described prior art patents, the initial wavefront A is positioned by the launcher 2 to be a distance D/2 away from the first lens 1A. The focal length of each lens 1 is slightly greater than D/2. Locations B are present every distance D along the propagating beam. Thus, the initial wavefront is replicated once each distance D. The embodiment shown in FIG. 1 works for one particular frequency only.

In the present invention, on the other hand, the initial wavefront A is placed a distance D away from the first phase setting means 1A, rather than a distance D/2 as in the prior art. The focal length of each phase setting means 1 is D/2. Points B occur every 2D along the row of phase setting means 1, rather than every D.

In FIGS. 2 and 3, points B occur immediately to the right of every other phase setting lens 1. FIG. 3 shows the effect of increasing the frequency of the beam from $L_0$ to $L_1$. Note that the locations C change with frequency. However, the locations B do not change. If $L_0$ were changed to $L_1$ in FIG. 1, the beam would not propagate.

In FIG. 4, the reflectors (1A, 1B, 1C, 1D) are ellipsoidal, and are sized and located such that the central point of each reflector surface (10A, 10B, 10C), 10D, respectively) falls on a focus of an adjacent reflector. As with the FIG. 2 and 3 embodiments, the phase and amplitude distribution of the wavefront is duplicated at each location labeled B. Locations B are 2D apart from each other, measured with respect to the (angled) midline (boresight) of the beam. In other words, the distance from point 5A (the midpoint of the nascent beam in cross-sectional plane A) to point 10A is D; the distance from point 10A to point 10B is D; the distance from point 10B to point 10C is D; the distance from point 10C to point 10D is D; etc.

The geometry of FIGS. 2-4 results in operable embodiments regardless of the frequency of the beam emitted by launcher 2, as long as the wavelength of the beam is much less than the diameter of the phase setting means 1. This gives true frequency independence. In addition, preferably D should be larger than the radius of each phase setting means 1. Lenses 1 should be thin so that both the phase and the amplitude are reset. For the same reason, when reflectors are used as phase setting means 1, the reflectors should be distortionless. Phase setting means 1 are all identical and symmetric about an axis that is orthogonal to the direction of beam propagation.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, the row of phase setting means 1 can be bent, e.g., by mirrors. Said row can comprise a combination of lenses and reflectors, rather than just lenses or just reflectors.

What is claimed is:

1. A quasi-infinitely broadbanded beam waveguide comprising a row of several phase setting means spaced a distance D apart from each other; and a launcher for emitting a beam of electromagnetic energy in the direction of the row of phase setting means; wherein the focal length of each phase setting means is D/2;

the launcher is spaced a distance D away from the first phase setting means in the row;

the wavelength of the beam is very small compared with the diameter of each phase setting means; and the phase and amplitude distribution in the cross-section of the beam at the launcher is duplicated every other phase setting means, independent of the frequency of the launched beam; whereby the beam propagates along the row, independent of frequency.

2. The beam waveguide of claim 1 wherein the beam emitted by the launcher varies in frequency; and the locations of phase distribution duplication and resulting propagation of the beam are substantially independent of frequency.

3. The beam waveguide of claim 1 wherein at least some phase setting means are lenses.

4. The beam waveguide of claim 1 wherein at least some phase setting means are reflectors.

5. The beam waveguide of claim 1 wherein the launcher comprises a corrugated horn.

6. The beam waveguide of claim 1 wherein the phase setting means are all identical, and each phase setting means is symmetrical about an axis that is orthogonal to the direction of propagation of the electromagnetic beam.

* * * * *